United States Patent
Brummayer (10) Patent No.: US 8,914,678 B2
(45) Date of Patent: Dec. 16, 2014

(54) SYSTEMS AND METHODS FOR DEBUGGING MODEL BASED MESSAGE SEQUENCES

(71) Applicant: Intel Mobile Communications GmbH, Neubiberg (DE)

(72) Inventor: Robert Daniel Brummayer, Linz (AT)

(73) Assignee: Intel Mobile Communications GmbH, Neubiberg (DE)

( * ) Notice: Subject to any disclaimer, the term of this patent is extended or adjusted under 35 U.S.C. 154(b) by 177 days.

(21) Appl. No.: 13/722,018

(22) Filed: Dec. 20, 2012

(65) Prior Publication Data

US 2014/0181597 A1   Jun. 26, 2014

(51) Int. Cl.
*G06F 11/00* (2006.01)

(52) U.S. Cl.
CPC .................. *G06F 11/006* (2013.01)
USPC .................. 714/37; 714/49; 703/17

(58) Field of Classification Search
USPC ........ 714/37, 39, 49; 703/17, 21, 22; 717/135
See application file for complete search history.

(56) References Cited

U.S. PATENT DOCUMENTS

| | | | |
|---|---|---|---|
| 6,807,583 B2 * | 10/2004 | Hrischuk et al. | 719/318 |
| 6,817,019 B1 | 11/2004 | Wang et al. | |
| 7,647,528 B2 | 1/2010 | Yilmaz et al. | |
| 8,078,915 B2 * | 12/2011 | Nakamura et al. | 714/37 |
| 2004/0164990 A1 | 8/2004 | Chan et al. | |
| 2005/0108384 A1 | 5/2005 | Lambert et al. | |
| 2008/0250273 A1 * | 10/2008 | Yilmaz et al. | 714/38 |
| 2009/0292951 A1 * | 11/2009 | Fournier et al. | 714/37 |
| 2011/0010693 A1 * | 1/2011 | Kahlon | 717/133 |
| 2011/0030061 A1 | 2/2011 | Artzi et al. | |
| 2011/0276832 A1 * | 11/2011 | Schneider et al. | 714/37 |
| 2012/0117541 A1 | 5/2012 | Bates | |
| 2014/0019795 A1 * | 1/2014 | Sonoda et al. | 714/2 |
| 2014/0032973 A1 * | 1/2014 | Baker | 714/39 |
| 2014/0046647 A1 * | 2/2014 | Tsai et al. | 703/14 |
| 2014/0122932 A1 * | 5/2014 | Chen et al. | 714/37 |

OTHER PUBLICATIONS

Andreas Zeller. "Simplyfiying and Isolating Failure-Inducing Input." IEEE Transactions on Software Engineering, vol. 28, No. 2. Feb. 2002. 18 Pages.

* cited by examiner

*Primary Examiner* — Marc Duncan
(74) *Attorney, Agent, or Firm* — Eschweiler & Associates, LLC (57) ABSTRACT

A system for simplifying message sequences is disclosed. The system includes a shrink component and a message simplification component. The shrink component is configured to receive a failure inducing message sequence and to provide a shrunk sequence based on the failure inducing message sequence. The shrunk sequence has less or equal number of messages than the failure inducing message sequence. The message simplification component is configured to receive the shrunk sequence and to simplify messages within the shrunk sequence to generate a simplified message sequence including debugging hints.

24 Claims, 5 Drawing Sheets

SYSTEMS AND METHODS FOR DEBUGGING MODEL BASED MESSAGE SEQUENCES

BACKGROUND OF THE INVENTION

Traditionally, devices have operated with a fairly specific set of functions and features. The functions and features of such traditional devices are specific to the type of a device. For example, a traditional phone uses functions, such as initiating calls, receiving calls, and the like related to a phone. In another example, a traditional music device uses functions, such as skipping to a next song, playing, pausing, and the like.

Current devices often include many feature sets of traditional devices in a single device. For example, a smart phone can include functions and features related to a phone, music player, electronic message system, video player, camera, and the like. Having the multiple feature sets causes the current devices to be more complex than traditional devices. This complexity makes the design and debugging of such devices challenging. Therefore, a need exists for an automated system for debugging designs of such devices.

DETAILED DESCRIPTION OF THE INVENTION

The present invention will now be described with reference to the attached drawing figures, wherein like reference numerals are used to refer to like elements throughout, and wherein the illustrated structures and devices are not necessarily drawn to scale.

Devices of today may include a mobile device, a personal computer, a tablet device. Devices may also include system on chip (SOC) and embedded systems that include a variety of function and feature sets. These sets include phones, cameras, video playback, multimedia, and the like. One technique to enhance development and design of these devices is to utilize an abstract model to test and debug development of such devices.

In the simplest form, an abstract model is represented as a labeled transition system. Each transition is labeled with a message or event which triggers a transition. The abstract model is an abstract representation of an actual system. The abstract model specifies various abstract system states and how each system state changes when the system is stimulated with incoming messages or events.

One issue is identified when a message sequence results in a system output or behavior that deviates from an expected or desired one. Such a message sequence is referred to as a failure inducing message sequence. This failure inducing message sequence can then be analyzed to identify the root cause of failure and to correct the design. However, such failure inducing message sequences typically comprise a relatively large number of messages and high complexity. As a result, debugging these failure inducing message sequences can be time consuming and difficult.

Systems and methods are disclosed that include techniques to automatically shrink and simplify failure inducing message sequences. As a result, simplified sequences are provided along with hints that can drastically reduce debugging efforts associated in debugging devices, in particular manual debugging efforts. Further, the simplified sequences can also facilitate identification of a particular technology area to target for debugging, such as a particular engineering department, and therefore improve failure triage.

Figure 1:
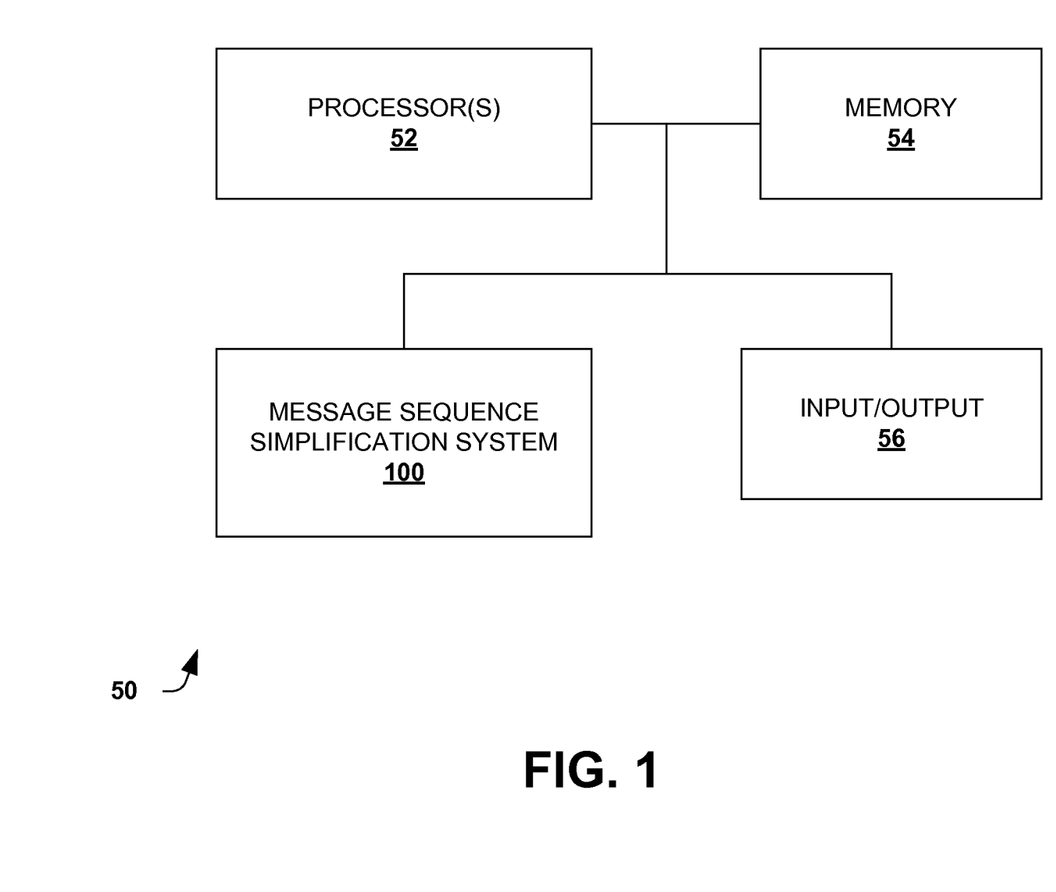
FIG. 1 is a block diagram illustrating a device utilizing a message sequence simplification system.

FIG. 1 is a block diagram illustrating a device 50 utilizing a message sequence simplification system 100. The device 50 may be at least a portion of a device, such as a mobile device, a personal computer, a tablet device, and the like. The device 50 may include a variety of function and/or feature sets.

The device 50 includes one or more processors 52, a memory 54, an input/output (I/O) component 56, and a message sequence simplification system 100. The processor 52 is configured to interact with the memory 54, the I/O component 56, and the message sequence simplification system 100. The processor 52 is further configured to execute instructions, including sequences, from the memory 54.

The memory 54 includes program code, data, and the like for operation of the device. The memory 54 may also include message sequences. The I/O component 56 is configured to receive information external to the device 50 and to provide information from the device 50.

The message sequence simplification system 100 receives failure inducing message sequences and generates simplified sequences with debugging hints therefrom. Additional details on the operation of such a system are provided below. The failure inducing message sequences can be received from the memory 54 or by the I/O component 56. Similarly, the simplified sequences with debugging hints can be stored in the memory 54 and/or provided to the I/O component 56.

The device 50 is provided as an example to facilitate understanding. It is appreciated that other suitable devices can utilize message sequence simplification systems.

Figure 2:
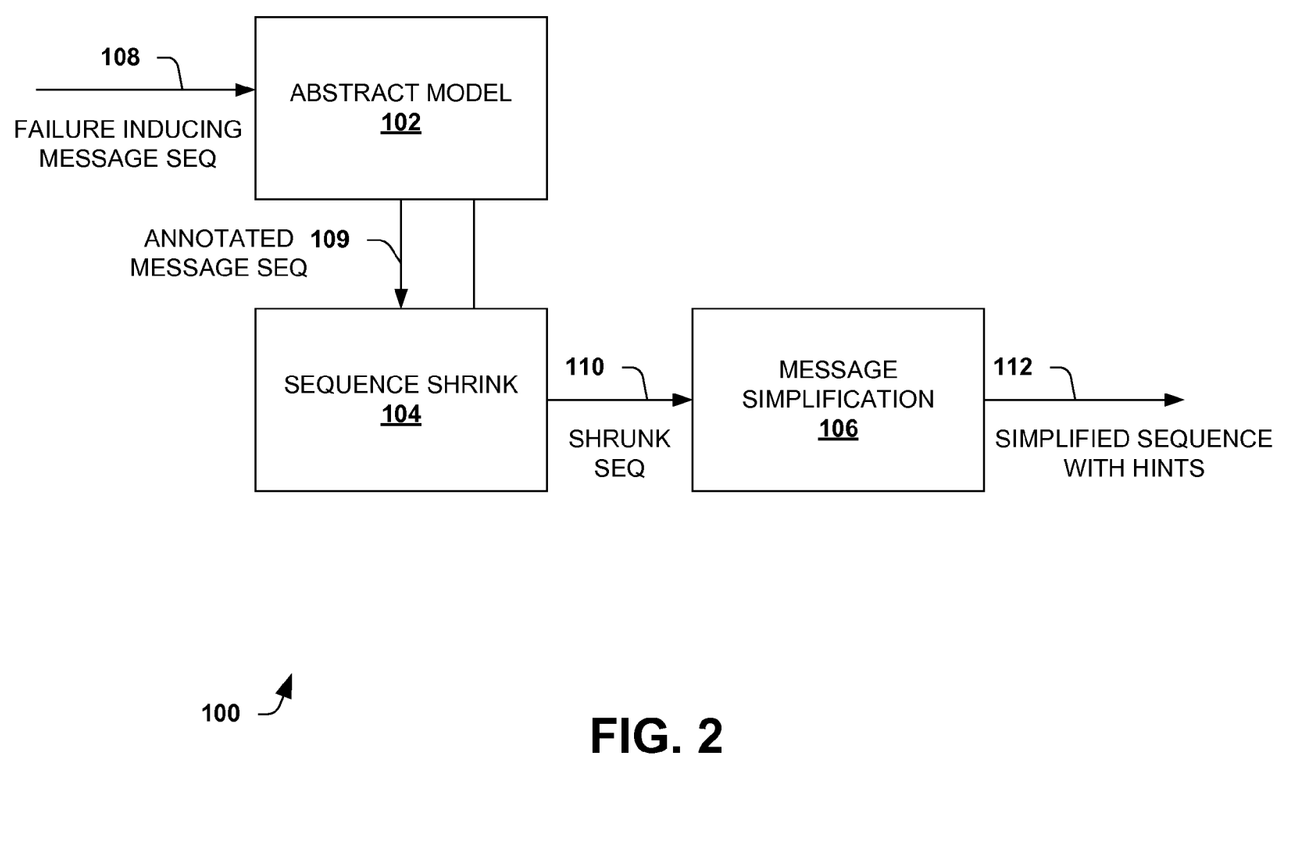
FIG. 2 is a block diagram illustrating a message sequence simplification system.

FIG. 2 is a block diagram illustrating a message sequence simplification system 100 in which sequence messages are simplified. The system 100 takes a message sequence as input and automatically generates a simplified sequence with simplified messages including debugging hints. The simplified sequence and debugging hints facilitate correcting or modifying a design of a device represented by an abstract model.

It is appreciated that at least a portion of the components of system 100 can be implemented in software executed on one or more computers, as machine readable instructions executable by one or more processors, and the like. Furthermore, the components of the system 100 can be at least partially stored on and/or utilize a computer readable medium. Alternatively, system 100 can be implemented as stand-alone software tool. Moreover, it is appreciated that it can interact with or can be part of a verification/validation system.

The system 100 includes an abstract model 102, a sequence shrink component 104, and a message simplification component 106. The abstract model 102 is a model of a design or behavior for a device, such as a mobile device. The device can include or can be part of a system on chip or embedded system. However, an abstract model 102 may represent design or behavior of devices other than mobile devices without departing the spirit and scope of the present disclosure, for example, devices that comprise a software system, a hardware system, or any combination of software and hardware systems. In addition, the design or behavior of devices represented by the abstract model 102 may be implemented in software, hardware, firmware, or any combination thereof.

The abstract model 102 is represented as a labeled transition system. The abstract model 102 has states and transitions and describes how the represented or modeled system performs state transitions when stimulated by messages. A transition is triggered by an incoming message or event. Each transition is labeled with a message or an event that triggers a particular transition from a particular state. It is appreciated that the term "event" is used in a broad sense. It can be used for various modeling purposes, for example represent function/method calls in software.

The abstract model 102 is utilized to annotate a failure inducing message sequence 108 and to provide an annotated message sequence 109, wherein each message is annotated with its triggering transition in the abstract model 102. The failure inducing message sequence 108 is a sequence of messages that results in a particular failure. The annotated message sequence 109 is the failure inducing message sequence 108, but with transition annotations.

The abstract model 102 can define which message sequences are valid and which are invalid. The abstract model 102 can be interpreted as an executable specification of a public application programming interface. Invalid message sequences lead the model 102 into a dedicated error state and violate the specification. An example abstract model is described below, however the description of system 100 continues after the example.

Figure 3A:
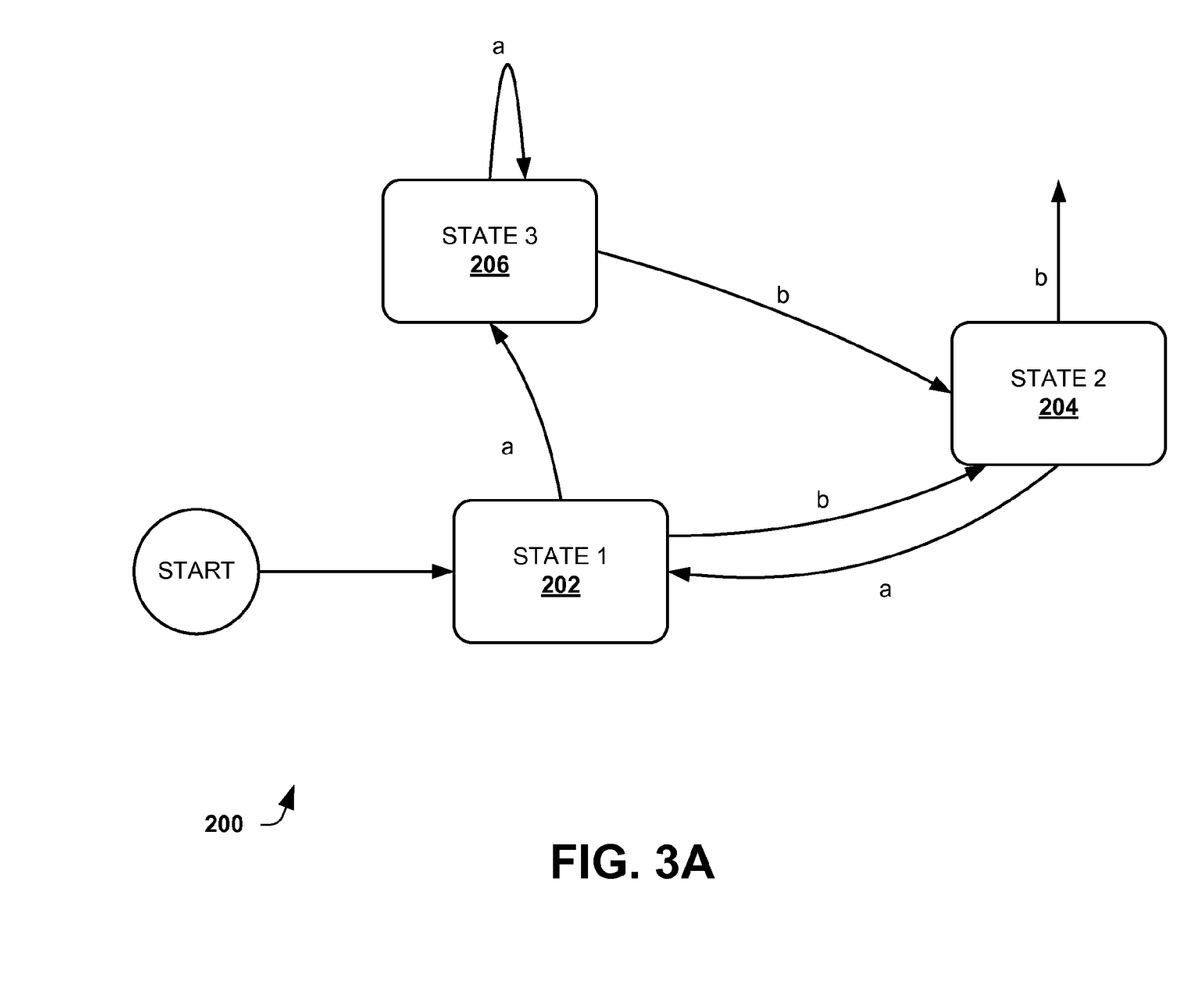
FIG. 3A is a state diagram depicting an example of an abstract model 200 that can be utilized with the system.

FIG. 3A is a state diagram depicting an example of an abstract model 200 that can be utilized with the system 100. The abstract model 200 is provided for illustrative purposes.

The model 200 is depicted with a first state 202, a second state 204, and a third state 206. Transitions to and between the states are shown as "a" and "b", where "a" and "b" are abstract messages. The transitions occur in response to a message received while in a particular state. Initially, the model is in the first state 202. From this state, an "a" message causes a transition to the third state 206 and a "b" message causes a transition to the second state 204.

A message sequence is a sequence of messages that causes a series of transitions to or among various states of the model. For example, S0-a>S1-a>S3-b>S2 can denote an initial transition "a" to state 1 202 (S1), followed by a transition "a" to state 3 206 (S3), followed by a transition "b" to state 2 204 (S2).

Returning to system 100 and FIG. 2, the message sequence 108 is simulated on the abstract model 102 by the shrink component 104. The result is the annotated message sequence 109. Alternatively, the annotation can also be part of the message sequence itself, i.e. the annotation can be added by the stimulus source or by the actual system. In this case the simulation on the abstract model can be omitted. The shrink component 104 attempts to shrink or simplify the message sequence 109 by minimizing or reducing the number of messages within the sequence. It is appreciated that variations of the message include variations where the shrink component 104 operates on the non-annotated sequence, the failure inducing message sequence 108.

The shrink component 104 systematically attempts to cut off parts of the sequence 108 and then tests or re-stimulates the system that is represented by the model 102 with the remaining sequence, referred to as a candidate. A shrink attempt or candidate is considered as successful if the system fails with the same failure produced by the failure inducing message sequence 108. A shrink attempt is considered as not successful if the system does not respond with the same failure produced by the failure inducing message sequence 108. The shrink component 104 continues with another shrink attempt until a suitable termination condition is met.

Some examples of suitable termination conditions include reaching a time limit or until all possible shrink attempts have been attempted. At this point, the remaining sequence that results in the same failure produced by the failure inducing message sequence 108 is provided as a shrunk or partially simplified sequence 110. In one example, the shrunk sequence 110 has a number of messages of less than 10 percent of the number of messages present in the original failure inducing message sequence 108.

The message shrink component 104 utilizes information from the model 102 to identify sub-sequences in order to generate candidates. Instead of performing arbitrary cuts which may result in invalid sequences that are not conform with the model, i.e. violate the specification, only valid candidates are generated. As a result, testing or evaluating of invalid candidates is avoided and the shrinking is performed relatively quicker.

An example of such sequence splitting and shrink attempts is provided below utilizing the example model 200 of FIG. 3A. An example failure inducing message sequence is shown as:

S0-a>S1-b>S2-a>S2-b>S1-b>S2-b>S1-b>S2-a>S2

Where "a" and "b" represent transition triggering messages and S0 represents an initial state, S1 represents the first state 202, S2 represents the second state 204, and S3 represents the third state 206.

The sequence can be split by S1 into a prefix, sub-sequences, and a postfix. The prefix is given by:

S0-a>S1

The prefix starts with the initial state and ends in the split state S1.

A sub-sequence is a sequence of messages that begins and ends with the same state. In this example, there are several sub-sequences that start at state S1 and end at state S1. A first sub-sequence is shown by S1-b>S2-a>S2-b>S1

A second sub-sequence is shown by

S1-b>S2-b>S1

A postfix is provided by

S1-b>S2-a>S2

The postfix is a message sequence at the end of the failure inducing message sequence which starts with the split state.

A first simplification candidate is provided by eliminating the first sub-sequence and the second sub-sequence:

S0-a>S1-b>S2-a>S2

A second simplification candidate is provided by eliminating the first sub-sequence:

S0-a>S1-b>S2-b>S1-b>S2-a>S2

A third simplification candidate is provided by eliminating the second sub-sequence as shown:

S0-a>S1-b>S2-a>S2-b>S1-b>S2-a>S2

The simplification candidates can be tested by the sequence shrink component 104 to determine if the candidates yield the same failure as the example failure inducing message. If so, one of the successful candidates can be provided as the partially simplified or shrunk sequence. If there are multiple successful candidates, one is chosen according to a selection criterion. In one example, the criterion is a length of the simplification candidate. According to the example criterion, the first simplification candidate, if successful, would be chosen as the shrunk sequence. Typically, shorter simplification candidates are tested first in order to minimize the number of simplification attempts.

The above example failure inducing message sequence is provided in order to facilitate understanding. The failure inducing message sequence 108 can have a relatively large number of messages and sub-sequences rendering any manual simplification to be infeasible. For example, the failure inducing message sequence 108 can include up to 10,000 or millions of individual messages.

As a result, the shrink component 104 can utilize a suitable technique to select subsets of subsequences in order to generate simplification candidates. One example of a suitable technique is delta debugging. Generally, delta debugging is a technique that automatically simplifies and isolates failure inducing inputs. This technique may be used to select subsets of sub-sequences after splitting. After shrinking the message sequence 109 to generate the shrunk sequence 110, individual messages of the sequence 110 can be further simplified and debugging hints can be generated as described below.

The message simplification component 106 simplifies messages within a message sequence. The message simplification component 106 receives the shrunk sequence 110 from the sequence shrink component 104 and provides a simplified sequence consisting of simplified messages with debugging hints. The message simplification component 106 analyzes the messages in the shrunk sequence 110 and considers various values for the message parts within the sequence 110. As a result of the analysis, the message component 106 generates a simplified sequence 112 and hints associated with remaining message parts.

The hints identify which sequence and/or message parts have an impact on whether the failure is observable or not.

The hints can also identify a technology group or area for analyzing the potential defects. For example, if the hints are primarily related to power management messages, the simplified sequence could be provided to a power management engineering group for analysis.

Figure 3B:
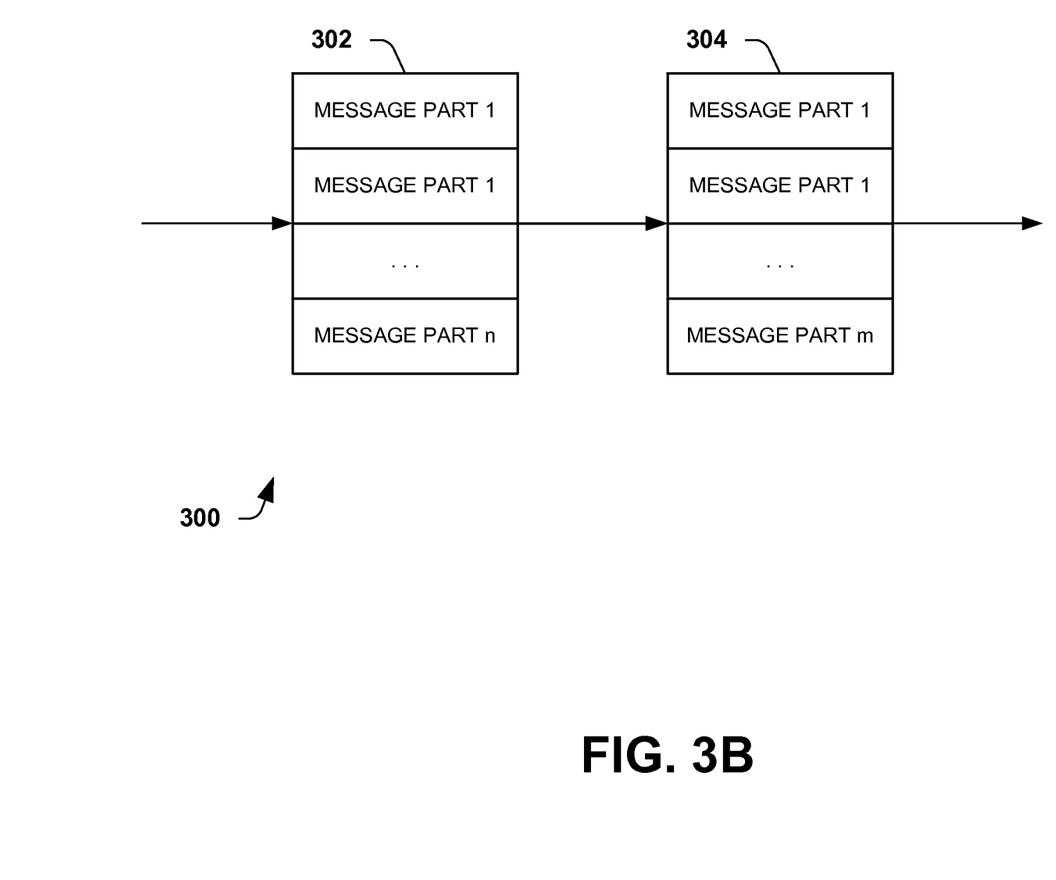
FIG. 3B is a diagram illustrating a portion of a failure inducing message sequence showing message parts.

FIG. 3B is a diagram illustrating a portion 300 of a failure inducing message sequence showing message parts. The portion 300 is provided as an example to illustrate and describe individual messages and message parts in a message sequence.

The portion 300 is shown with a first message 302 and a second message 304. The first message 302 has a plurality of message parts from 1 to n. The second message 304 has a plurality of message parts from 1 to m. Each message part can have one or more values, including a default value, a disabled value, and the like. As can be seen, the number of message parts per message can vary.

Returning to FIG. 2, the message component 106 analyzes set values for the message parts within the shrunk sequence 110. The message component 106 can also modify values of message parts and test the shrunk sequence 110 with the modified message part values.

Default values are generally considered to be more common and less likely to induce a particular failure. Typically, failures occur for message parts set to non-default values. As a result, message parts that can be set to default values are deemed unlikely to have a connection to the identified failure. Thus, the message parts that are not able to be set to default values can be deemed likely to have a connection to the identified failure.

Additionally, message parts can be set to a disabled value that effectively disables the message part and/or an associated system feature. Message parts that are disabled while the message sequence still yields the identified failure are deemed unlikely to have a connection to the identified failure.

As a result, the message component 106 returns a shrunk message sequence where individual message parts have been set to default values. Moreover, the message sequence includes debugging hints and triggers the same observable failure as the original message sequence 108.

Figure 4:
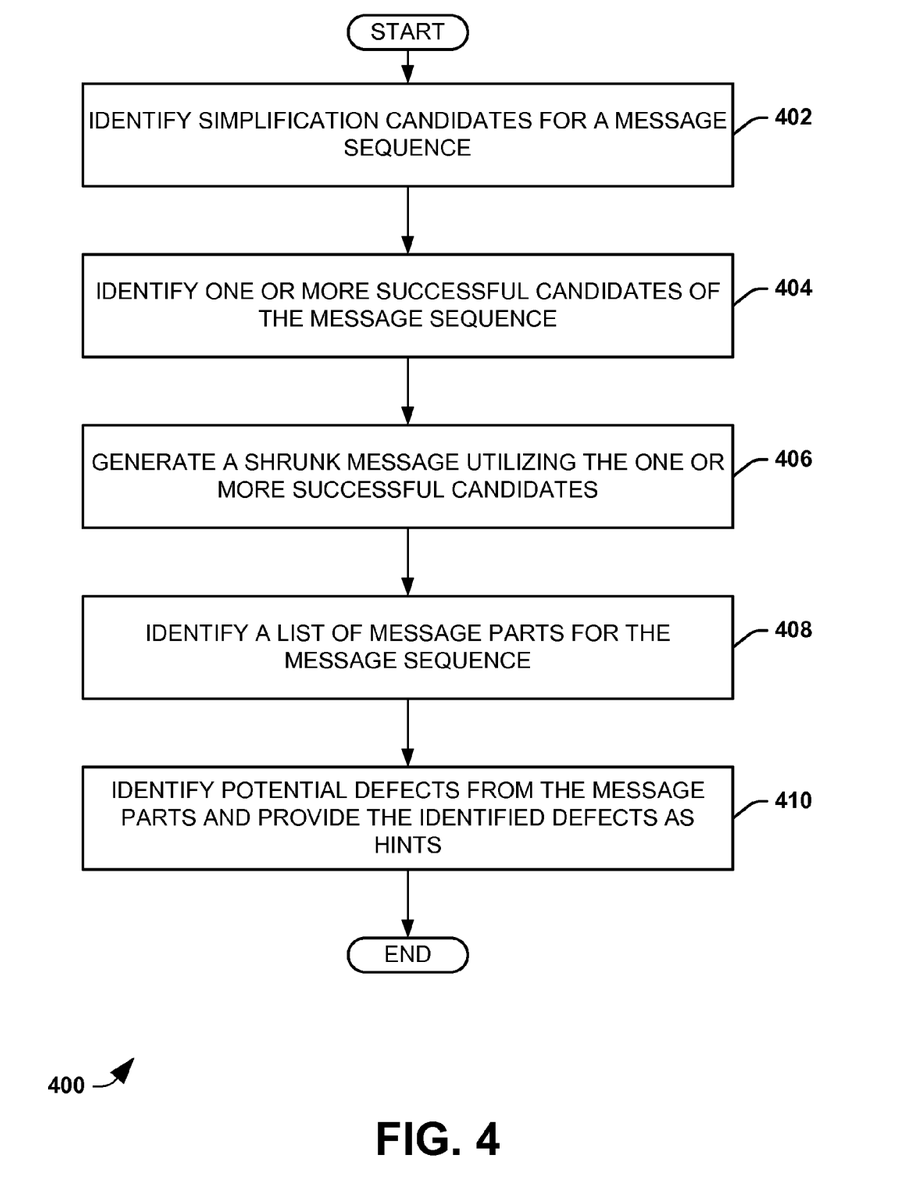
FIG. 4 is a flow diagram illustrating a method of simplifying a message sequence.

FIG. 4 is a flow diagram illustrating a method 400 of simplifying a message sequence. The method 400 simplifies a failure inducing message sequence and generates debugging hints. A simplified sequence and the debugging hints facilitate identifying a cause of a particular failure.

The method 400 begins at block 402, where one or more simplification candidates are identified for a message sequence. The message sequence is a sequence of messages usable in an event or message driven system. The message sequence typically causes a failure in a system. The message sequence can include annotations, such as triggering transitions for each message in the sequence.

The simplification candidates can be identified from the message sequence using a suitable technique, such as described above. Various portions of the message sequence are identified including a prefix portion (beginning portion), a postfix portion (an ending portion, and zero or more sub-sequences in between. The sub-sequences are identified using a suitable technique, such as a greedy algorithm, to identify portions of the message sequence that start and end with a particular state. The sub-sequences are then compiled with the prefix portion and the postfix portion to generate the one or more simplification candidates.

The one or more simplification candidates are tested at block 404 to identify one or more successful candidates. A successful candidate is a candidate that results in or reproduces the original failure.

A shrunk message sequence is generated at block 406 according to the one or more successful candidates. The one or more successful candidate can be analyzed to determine which of the candidates are simplest. Shorter candidates are tested first and the successful candidate with the smallest length is selected and provided as the shrunk message sequence.

A list of message parts and possible values for the message parts are identified at block 408. The message parts are portions of individual messages, such as shown in FIG. 3B, which can be set to the possible values. The possible values can include a default value, a disabled value, other values, and the like. The default value indicates a value that the message part is most often or commonly set to. Generally, a message part currently set to a default value is less likely to be a direct or proximate cause of the failure. Further, if a message part can be disabled, it is also less likely to be a cause of the failure.

Thus, at block 410, the message parts are set to default values and a portion of the message parts are identified as potential defects and provided as debugging hints. One group is identified from message parts that are set to default values that do not reproduce the failure. The message parts can also be used to identify and remove non-relevant messages from the shrunk message sequence to generate a simplified message sequence.

The simplified message sequence and the debugging hints can be utilized to debug a system related to the message sequence. Further, the message sequence and/or the debugging hints can be utilized to identify or assign technology areas to perform debugging.

While the methods provided herein are illustrated and described as a series of acts or events, the present disclosure is not limited by the illustrated ordering of such acts or events. For example, some acts may occur in different orders and/or concurrently with other acts or events apart from those illustrated and/or described herein. In addition, it may be that not all illustrated acts are required. Further, one or more of the acts depicted herein may be carried out in one or more separate acts or phases.

It is noted that the claimed subject matter may be implemented as a method, apparatus, or article of manufacture using standard programming and/or engineering techniques to produce software, firmware, hardware, or any combination thereof to control a computer to implement the disclosed subject matter (e.g., the systems shown above, are non-limiting examples of circuits that may be used to implement disclosed methods and/or variations thereof). The term "article of manufacture" as used herein is intended to encompass a computer program accessible from any computer-readable device, carrier, or media. Those skilled in the art will recognize many modifications may be made to this configuration without departing from the scope or spirit of the disclosed subject matter.

A system for simplifying message sequences is disclosed. The system includes a message sequence shrink component and a message simplification component. The shrink component is configured to receive a failure inducing message sequence and to provide a shrunk sequence based on the failure inducing message sequence. The shrunk sequence has less or equal number of messages than the original failure inducing message sequence. The message simplification component is configured to receive the shrunk sequence and to simplify individual messages within the shrunk sequence to generate a simplified message sequence including debugging hints.

A method of simplifying a message sequence is disclosed. One or more simplification candidates are identified from a message sequence. The one or more simplification candidates are tested to identify at least one successful candidate. A shrunk message sequence is generated based on successful candidates. Additionally, message parts of the shrunk message sequence can be identified and tested to identify likely defective message parts hints.

A method of simplifying a list of message parts is disclosed. A list of message parts from a message sequence is disclosed. Message parts are set to first values. Successful candidates are identified as message parts set to first values that reproduce an original message sequence failure. Unsuccessful candidate message parts are identified and provided as debugging hints.

Although the invention has been illustrated and described with respect to one or more implementations, alterations and/or modifications may be made to the illustrated examples without departing from the spirit and scope of the appended claims. Furthermore, in particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention. In addition, while a particular feature of the invention may have been disclosed with respect to only one of several implementations, such feature may be combined with one or more other features of the other implementations as may be desired and advantageous for any given or particular application. Furthermore, to the extent that the terms "including", "includes", "having", "has", "with", or variants thereof are used in either the detailed description and the claims, such terms are intended to be inclusive in a manner similar to the term "comprising".

What is claimed is:

1. A system for simplifying message sequences comprising:
    a shrink component configured to receive a failure inducing message sequence and to generate a shrunk sequence based on the failure inducing message sequence, wherein the shrunk sequence comprises a reduced number of messages than the failure inducing message sequence; and
    a message simplification component configured to receive the shrunk sequence and simplify a plurality of messages within the shrunk sequence to generate a simplified message sequence.

2. The system of claim 1, wherein the shrink component is configured to identify one or more simplification candidates within the failure inducing message sequence and provide the shrunk sequence based on the one or more simplification candidates.

3. The system of claim 2, wherein the shrink component is configured to test the one or more simplification candidates using an abstract model to identify one or more successful candidates.

4. The system of claim 1, wherein the shrink component annotates one or more messages of the failure inducing message sequence with its triggering transition using an abstract model.

5. The system of claim 1, wherein the simplified sequence and the failure inducing message sequence lead to the same observable failure.

6. The system of claim 1, further comprising an abstract model coupled to the shrink component and the message simplification component, wherein the abstract model is a message/event driven model.

7. The system of claim 6, wherein the abstract model represents a design or behavior of a device.

8. The system of claim 7, wherein the design or behavior of the device is implemented in software, firmware, hardware, or any combination thereof.

9. The system of claim 1, wherein the simplification component is configured to provide debugging hints along with the simplified sequence.

10. The system of claim 9, wherein the debugging hints indicate a technology area.

11. The system of claim 1, wherein the message simplification component is configured to analyze message parts of the shrunk sequence to identify possible defects.

12. The system of claim 1, wherein the message simplification component is configured to identify message parts unlikely to cause a failure.

13. The system of claim 1, wherein the message simplification component is configured to identify message parts of the shrunk message sequence and to test various values for the identified message parts on an abstract model.

14. The system of claim 1, wherein the message simplification component utilizes a heuristic algorithm to eliminate non-default message parts from a set of message parts of the shrunk sequence.

15. A method of simplifying a message sequence, the method comprising:
    identifying one or more simplification candidates from the message sequence;

testing the one or more simplification candidates to identify at least one successful candidate; and generating a shrunk message sequence based on the at least one successful candidate.

16. The method of claim 15, further comprising identifying message parts of the shrunk message sequence and testing the identified message parts to identify likely defective message parts hints.

17. The method of claim 15, further comprising setting message parts of the shrunk message sequence to default values and identifying those message parts as successful message parts that reproduce an error.

18. The method of claim 17, further comprising removing the successful message parts from a list of possible message parts to generate a list of remaining message parts.

19. The method of claim 18, further comprising providing the list of remaining message parts as debugging hints.

20. The method of claim 19, further comprising debugging a system based on the debugging hints.

21. A method of simplifying a list of message parts, the method comprising:

obtaining a list of message parts from a message sequence;

setting the message parts to first values;

identifying successful candidate message parts set to the first values that reproduce an original message sequence failure;

identifying unsuccessful candidate message parts set to the first values that do not reproduce the original message sequence failure; and providing the unsuccessful candidate message parts as debugging hints.

22. The method of claim 21, wherein the first values are default values.

23. The method of claim 21, wherein the original message sequence failure is a failure induced by the message sequence.

24. The method of claim 21, wherein identifying successful candidate message parts comprises testing the message parts with the first values on an actual system.

* * * * *